(12) United States Patent
Weitzman et al.

(10) Patent No.: US 12,457,560 B2
(45) Date of Patent: Oct. 28, 2025

(54) WIRELESS TRANSMITTER AND A METHOD FOR TRANSMITTING DATA

(71) Applicant: HUAWEI TECHNOLOGIES CO., LTD., Shenzhen (CN)

(72) Inventors: Avi Weitzman, Hod Hasharon (IL); Doron Ezri, Hod Hasharon (IL); Ezer Melzer, Hod Hasharon (IL); Shahar Patury, Hod Hasharon (IL); Xingfeng Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 17/960,451

(22) Filed: Oct. 5, 2022

(65) Prior Publication Data
US 2023/0027617 A1    Jan. 26, 2023

Related U.S. Application Data

(63) Continuation of application No. PCT/EP2020/061050, filed on Apr. 21, 2020.

(51) Int. Cl.
    *H04W 52/24*    (2009.01)
    *H04B 17/336*   (2015.01)
    (Continued)

(52) U.S. Cl.
    CPC ........ *H04W 52/241* (2013.01); *H04B 17/336* (2015.01); *H04L 1/0003* (2013.01); *H04L 1/0009* (2013.01); *H04W 52/262* (2013.01)

(58) Field of Classification Search
    CPC ............. H04W 52/241; H04W 52/262; H04W 52/267; H04W 52/247; H04B 17/336;
    (Continued)

(56) References Cited

U.S. PATENT DOCUMENTS

2019/0306806 A1*  10/2019  Sood ................... H04W 52/245
2020/0037183 A1*   1/2020  Ganu ................... H04B 17/336
(Continued)

FOREIGN PATENT DOCUMENTS

CN      105813101 A   *  7/2016
WO      2015139741 A1    9/2015
(Continued)

*Primary Examiner* — Lana N Le
(74) *Attorney, Agent, or Firm* — Maier & Maier, PLLC (57) ABSTRACT

A positioning method and apparatus, a WLAN device, and a storage medium are disclosed, and relates to the field of positioning technologies. The positioning method includes: a WLAN device obtains an uplink scheduling parameter sent by another WLAN device to a plurality of to-be-positioned WLAN devices, where the uplink scheduling parameter is used to indicate radio resources allocated to the plurality of to-be-positioned WLAN devices; the WLAN device receives uplink signals; and the WLAN device measures respective positioning data of the plurality of to-be-positioned WLAN devices based on the radio resources of the plurality of to-be-positioned WLAN devices and the received uplink signals. The embodiments can improve positioning timeliness of the to-be-positioned WLAN devices.

12 Claims, 9 Drawing Sheets

| MCS | Modulation | Code Rate | 11ac EVM | 11ax EVM | | SNR |
| | | | | Tx power > MCS7 power | Tx power < MCS7 power | |
|---|---|---|---|---|---|---|
| 0 | BPSK | 1/2 | -5 | -13 | -27 | 2 |
| 1 | QPSK | 1/2 | -10 | -13 | -27 | 5 |
| 2 | QPSK | 3/4 | -13 | -13 | -27 | 9 |
| 3 | 16QAM | 1/2 | -16 | -16 | -27 | 11 |
| 4 | 16QAM | 3/4 | -19 | -19 | -27 | 15 |
| 5 | 64QAM | 2/3 | -22 | -22 | -27 | 18 |
| 6 | 64QAM | 3/4 | -25 | -25 | -27 | 20 |
| 7 | 64QAM | 5/6 | -27 | -27 | -27 | 25 |
| 8 | 256QAM | 3/4 | -30 | -30 | -30 | 29 |
| 9 | 256QAM | 5/6 | -32 | -32 | -32 | 31 |
| 10 | 1024QAM | 3/4 | -35 | -35 | -35 | 33 |
| 11 | 1024QAM | 5/6 | -35 | -35 | -35 | 35 |

(51) Int. Cl.
*H04L 1/00* (2006.01)
*H04W 52/26* (2009.01)

(58) Field of Classification Search
CPC .... H04B 17/102; H04B 17/20; H04B 17/328; H04B 17/309; H04B 1/0475; H04B 7/0426; H04B 7/0456; H04B 7/0632; H04B 17/373; H04B 7/0639; H04B 2001/0408; H04B 17/14; H04B 1/525; H04L 1/0003; H04L 1/0009; H04L 1/0023; H04L 1/0002; H04L 27/38; H04L 1/0006; H04L 1/20; H04L 27/20; H04L 27/2601; H04L 27/34; H04L 27/2614; H04L 27/361; H04L 1/0025

See application file for complete search history.

(56) References Cited

U.S. PATENT DOCUMENTS

| | | | |
|---|---|---|---|
| 2020/0037337 A1* | 1/2020 | Patwardhan | H04W 52/241 |
| 2023/0118590 A1* | 4/2023 | Lee | H04W 52/241 |
| | | | 370/329 |

FOREIGN PATENT DOCUMENTS

| | | | | |
|---|---|---|---|---|
| WO | 2019018775 A1 | 1/2019 | | |
| WO | WO-2022011575 A1 * | 1/2022 | | H04W 52/24 |

* cited by examiner

| MCS | Modulation | Code Rate | 11ac EVM | 11ax EVM | | SNR |
|---|---|---|---|---|---|---|
| | | | | Tx power > MCS7 power | Tx power < MCS7 power | |
| 0 | BPSK | 1/2 | -5 | -13 | -27 | 2 |
| 1 | QPSK | 1/2 | -10 | -13 | -27 | 5 |
| 2 | QPSK | 3/4 | -13 | -13 | -27 | 9 |
| 3 | 16QAM | 1/2 | -16 | -16 | -27 | 11 |
| 4 | 16QAM | 3/4 | -19 | -19 | -27 | 15 |
| 5 | 64QAM | 2/3 | -22 | -22 | -27 | 18 |
| 6 | 64QAM | 3/4 | -25 | -25 | -27 | 20 |
| 7 | 64QAM | 5/6 | -27 | -27 | -27 | 25 |
| 8 | 256QAM | 3/4 | -30 | -30 | -30 | 29 |
| 9 | 256QAM | 5/6 | -32 | -32 | -32 | 31 |
| 10 | 1024QAM | 3/4 | -35 | -35 | -35 | 33 |
| 11 | 1024QAM | 5/6 | -35 | -35 | -35 | 35 |

WIRELESS TRANSMITTER AND A METHOD FOR TRANSMITTING DATA

CROSS-REFERENCE TO RELATED APPLICATIONS

This application is a continuation of International Application No. PCT/EP2020/061050, filed on Apr. 21, 2020. The disclosures of the aforementioned application is hereby incorporated by reference in its entirety.

TECHNICAL FIELD

The embodiments relate to wireless communications, a wireless transmitter for transmitting data to a wireless receiver, and a corresponding method for transmitting data.

BACKGROUND

Figure 1A:
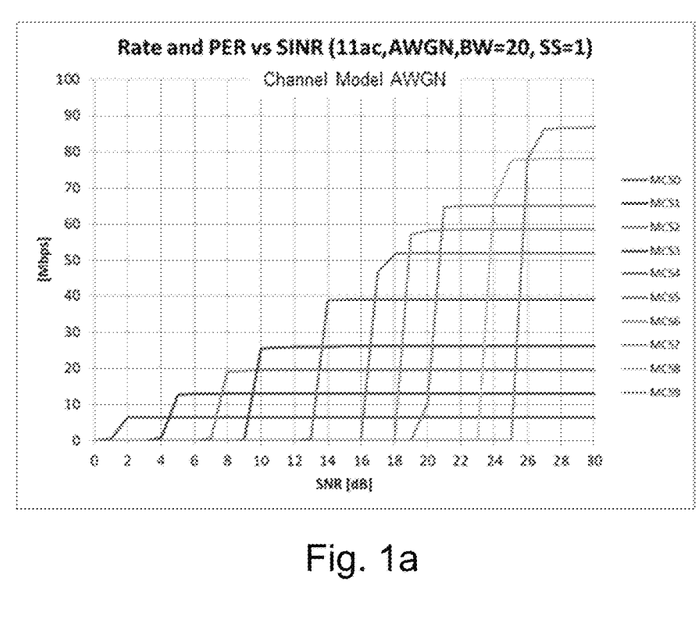
FIG. 1A shows a graph illustrating the relation between the data rate and the SNR for a plurality of different MCSs and two different channel models.
Figure 1B:
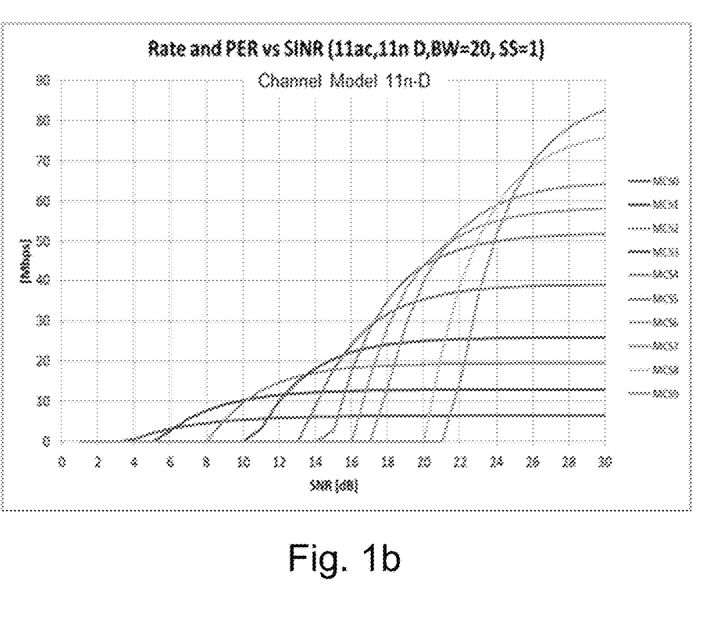
FIG. 1B shows a graph illustrating the relation between the data rate and the SNR for a plurality of different MCSs and two different channel models.

IEEE-802.11-based WLANs became popular at an unprecedented rate. WLAN supports a variety of data transfer modes including (but not only) file transfer, emails, web browsing and real-time applications, such as audio and video applications. In order to efficiently support high throughputs, the evolving IEEE 802.11 standards specify multiple physical layer (PHY) rates that can be used by a wireless transmitter for communicating with a wireless receiver, depending on the deployed Modulation and Coding Scheme (MCS). High PHY rates enable shorter transmit times (of a frame) and thus allow a more efficient use of the communication medium. However, high PHY rates are more susceptible to channel conditions than lower PHY rates. Low PHY rates on the other hand require longer transmit times but are more resilient to errors. FIGS. 1A and 1B illustrate the different PHY rates achievable with the Modulation and Coding Schemes known as MCS0-MCS9 for two different channel models.

WLAN frames that are not decoded successfully at the wireless receiver need to be retransmitted by the wireless transmitter until received successfully. Therefore, high bit error rates in transmissions at high rates over wireless links with poor quality may eventually cause longer transmission times than transmitting the same frame once (successfully) at a lower PHY rate.

As will be appreciated, the quality of a wireless link, i.e., the link performance depends on the transmission power $P_{Tx}$ of the wireless transmitter (Tx). For any given (fixed) MCS, the detection performance of the wireless receiver (Rx) depends on the transmission power $P_{Tx}$ via two different conflicting mechanisms. Increasing the transmission power $P_{Tx}$ increases the received desired signal power at the wireless receiver, denoted by $P_{Rx}$, and thus improves the detection performance. However, due to non-linear distortion effects of the power amplifier (PA) of the wireless transmitter an increase of the transmission power $P_{Tx}$ increases the transmitted signal distortion, also known as Error Vector Magnitude (Tx-EVM), which in turn contributes more to the total effective noise accompanying the (desired) signal at the wireless receiver, denoted $I_{Rx}$, thus degrading the detection performance.

Using the notation introduced above, the detection performance of the wireless receiver (per MCS) is essentially determined by the power ratio $P_{Rx}/I_{Rx}$, which is herein referred to as the Signal-to-Interference-plus-Noise-Ratio (SINR). Strictly speaking, in a multi-carrier transmission scheme (e.g., OFDM, such as used in IEEE 802.11), the wireless propagation channel may be frequency selective and so the SINR may vary between the subcarriers used within the whole channel bandwidth (BW). If, furthermore, spatial multiplexing is deployed, then the SINR may also vary between the different spatial streams. This in general leads to the notion of an effective SINR, which stands for some (not necessarily linear) average of the SINRs per subcarrier (and stream), which actually dictates the detection performance.

Figure 2:
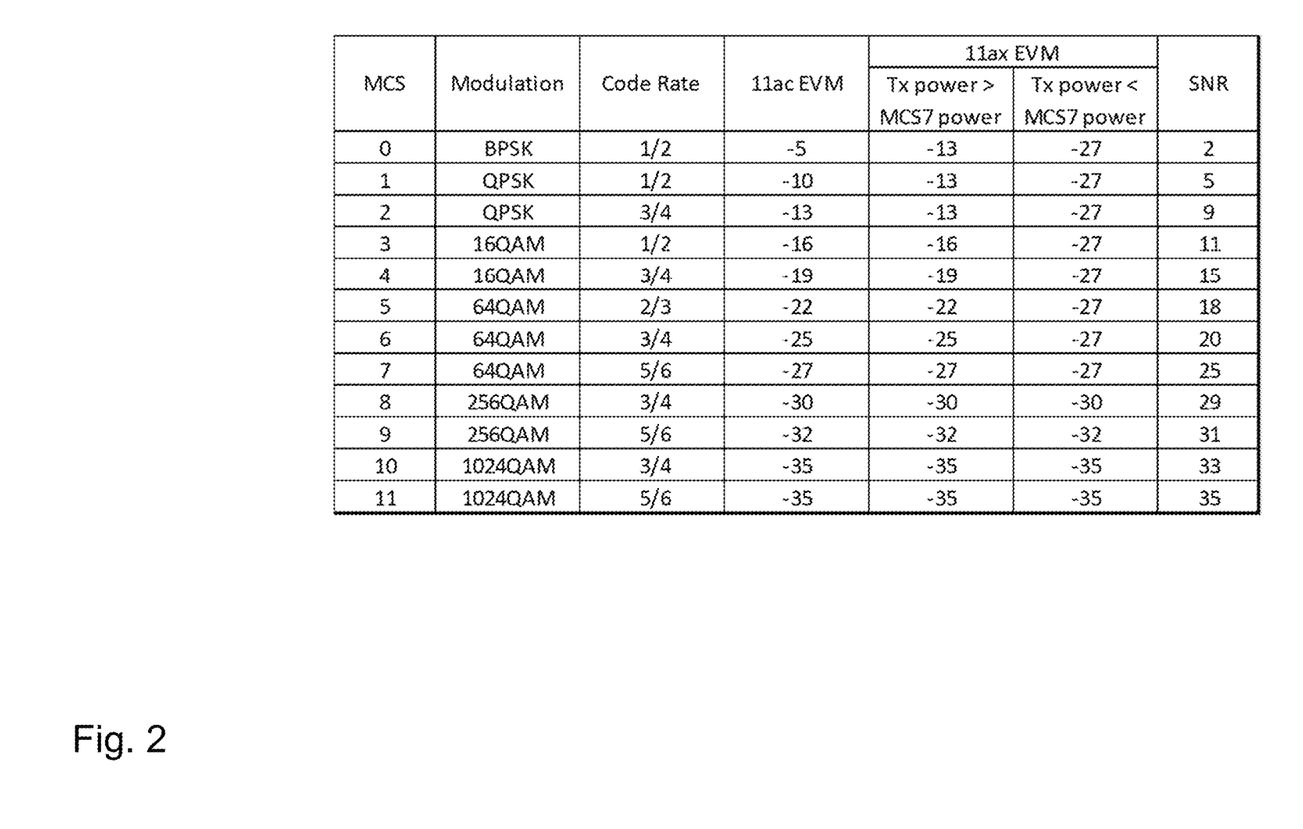
FIG. 2 shows a table illustrating the IEEE802.11 EVM requirements for conventional wireless transmitters.

The IEEE 802.11 specification copes with the abovementioned EVM problem by imposing on the wireless transmitter strict requirements with respect to the maximal allowed values of Tx-EVM per MCS, regardless of the receiver and channel conditions. Different Task Groups (such as 11Ac and 11Ax) specified somewhat different EVM requirements, as shown by the table of FIG. 2 (where the cited EVM values stand for the power ratio between the distortion to the desired "clean" ideal Tx signal). The table shown in FIG. 2 lists for each of the the Modulation and Coding Schemes known as MCS0-MCS11 a modulation scheme, such as BPSK, QPSK, 16QAM and the like, a code rate, the 11Ac EVM, the 11Ax EVM and the SNR. With respect to the table shown in FIG. 2 it should be appreciated that currently the most Wi-Fi PAs cannot support EVM<−20 dB at a transmitted power>20 dBm. Actually, most current Wi-Fi PAs reach an EVM below −35 dB (which is required for 1K-QAM) only at a transmitted Tx power below 15 dBm.

In many Wi-Fi scenarios, the wireless transmitter does not know the current SNR at the wireless receiver. Moreover, any SINR measurements of the Wi-Fi receiver are usually not accurate, so that the wireless transmitter cannot rely on them even if the wireless receiver reports them back to the wireless transmitter. To overcome the lack of knowledge about the SINR at the wireless receiver, conventional Wi-Fi transmitters usually select a default value for the transmitter output power Back-Off (BO), typically by using a Look-Up Table (LUT) that sets the Tx power given the PHY rate (MCS, BW, number of spatial streams, Tx mode, etc.), so as to comply with the associated EVM requirement. This effectively means that the wireless transmitter uses a fixed EVM value per PHY rate, which may result in suboptimal link performance.

SUMMARY

It is an objective to provide an improved wireless transmitter for transmitting data to a wireless receiver and a corresponding method providing an improved link performance.

The foregoing and other objects are achieved by the embodiments. Further implementation forms are apparent from the description and the figures.

According to a first aspect, a wireless transmitter (Tx) is provided configured to transmit data to a wireless receiver (Rx) using a selected modulation and coding scheme, MCS, of a plurality of selectable MCSs, where each MCS defines an upper limit of an error vector magnitude, EVM, corresponding to an upper limit of a transmitted power $P_{T_x}$ (also referred to as transmission power) of the wireless transmitter. The wireless transmitter is configured to transmit data to the wireless receiver using the selected MCS and an adjusted transmitted power that is larger or smaller than the upper limit of the transmitted power, if the combined effects of an adjusted EVM and an adjusted received power at the wireless receiver caused by the adjusted transmitted power result in an improved data transmission performance in comparison with a data transmission using a transmitted power equal to the upper limit of the transmitted power.

Thus, instead of using a single transmitted power per PHY rate, the wireless transmitter is advantageously configured to use an "optimal" transmitted power (and EVM) for each PHY rate, by implicitly adjusting the transmitted power to the wireless receiver's link quality.

In a further possible implementation form of the first aspect, the improved data transmission performance is a larger signal-to-interference-plus-noise ratio, SINR, at the wireless receiver, where the wireless transmitter is configured to determine whether the combined effects of the adjusted EVM and the adjusted received power caused by the adjusted transmitted power result in a larger SINR at the wireless receiver on the basis of information about a SINR at the wireless receiver for a preceding data transmission.

In a further possible implementation form of the first aspect, the wireless transmitter is configured to obtain the information about the SINR at the wireless receiver for the preceding data transmission from the wireless receiver.

In a further possible implementation form of the first aspect, the wireless transmitter for determining whether the combined effects of the adjusted EVM and the adjusted received power caused by the adjusted transmitted power result in a larger SINR at the wireless receiver is configured to estimate a signal-to-noise ratio, SNR, at the wireless receiver for the preceding data transmission on the basis of the information about the SINR at the wireless receiver for the preceding data transmission and a relation between the transmitted power of the wireless transmitter for the preceding data transmission and the EVM resulting from the transmitted power for the preceding data transmission.

In a further possible implementation form of the first aspect, the wireless transmitter for determining whether the combined effects of the adjusted EVM and the adjusted received power caused by the adjusted transmitted power result in a larger SINR at the wireless receiver the wireless transmitter is further configured to estimate a current SNR at the wireless receiver by weighting the SNR at the wireless receiver for the preceding data transmission with the ratio between the adjusted transmitted power and the transmitted power for the preceding data transmission.

In a further possible implementation form of the first aspect, the wireless transmitter for determining whether the combined effects of the adjusted EVM and the adjusted received power caused by the adjusted transmitted power result in a larger SINR at the wireless receiver the wireless transmitter is further configured to determine the current SINR at the wireless receiver on the basis of the current SNR at the wireless receiver and the relation between the transmitted power of the wireless transmitter and the EVM resulting from the transmitted power.

In a further possible implementation form of the first aspect, the wireless transmitter includes a power amplifier for transmitting the data to the wireless receiver and where the relation between the transmitted power of the wireless transmitter and the EVM resulting from the transmitted power is defined by the power amplifier.

In a further possible implementation form of the first aspect, the wireless transmitter is further configured to determine the transmitted power which provides the maximal current SINR at the wireless receiver as the adjusted transmitted power.

In a further possible implementation form of the first aspect, the wireless transmitter is further configured to switch to another MCS having a higher data rate than the currently selected MCS, if the combined effects of the adjusted EVM and the adjusted received power caused by the adjusted transmitted power result in a larger SINR at the wireless receiver. Thus, advantageously the wireless transmitter may dynamically select an "optimal" pair of transmitted power and PHY rate per destination and use it for the next data transmission.

In a further possible implementation form of the first aspect, the improved data transmission performance is a larger goodput at the wireless receiver, where the wireless transmitter is configured to determine whether the combined effects of the increased EVM and the increased received power caused by the increased transmitted power result in a larger goodput at the wireless receiver for a plurality of increased transmitted powers and a plurality of MCSs.

In a further possible implementation form of the first aspect, the wireless transmitter is further configured to select the adjusted transmission power and MCS providing the largest goodput at the wireless receiver.

In a further possible implementation form of the first aspect, the wireless transmitter includes a rate control algorithm, RCA, for selecting the adjusted transmission power and MCS providing the largest goodput at the wireless receiver.

According to a second aspect, a corresponding method for transmitting data from a wireless transmitter to a wireless receiver is provided using a selected modulation and coding scheme, MCS, of a plurality of MCSs, where each MCS defines an upper limit of an error-vector-magnitude, EVM, corresponding to an upper limit of a transmitted power used for transmitting data by the wireless transmitter. The method includes the step of transmitting data to the wireless receiver using the selected MCS and an adjusted transmitted power that is larger or smaller than the upper limit of the transmitted power, if the combined effects of an adjusted EVM and an adjusted received power at the wireless receiver caused by the adjusted transmitted power result in an improved data transmission performance in comparison with a data transmission using a transmitted power equal to the upper limit of the transmitted power.

The data transmission method according to the second aspect can be performed by the wireless transmitter according to the first aspect. Thus, further features of the data transmission method according to the second aspect result directly from the functionality of the wireless transmitter according to the first aspect and its different implementation forms described above and below.

According to a third aspect, a computer program product is provided including a non-transitory computer-readable storage medium carrying program code which causes a computer or a processor to perform the method according to the second aspect when the program code is executed by the computer or the processor.

Details of the one or more embodiments are set forth in the accompanying drawings and the description below. Other features, objects, and advantages will be apparent from the description and drawings.

BRIEF DESCRIPTION OF THE DRAWINGS

In the following, embodiments are described in more detail with reference to the attached figures and drawings, in which.

In the following identical reference signs refer to identical or at least functionally equivalent features.

DETAILED DESCRIPTION OF THE EMBODIMENTS

In the following, reference is made to the accompanying figures which show, by way of illustration, aspects of the embodiments. It is understood that the embodiments may be used in other aspects and include structural or logical changes not depicted in the figures. The following description, therefore, is not to be taken in a limiting sense.

For instance, it is to be understood that the embodiments, in connection with a described method, may also hold true for a corresponding device or system configured to perform the method and vice versa. For example, if one or a plurality of method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g., functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Figure 3:
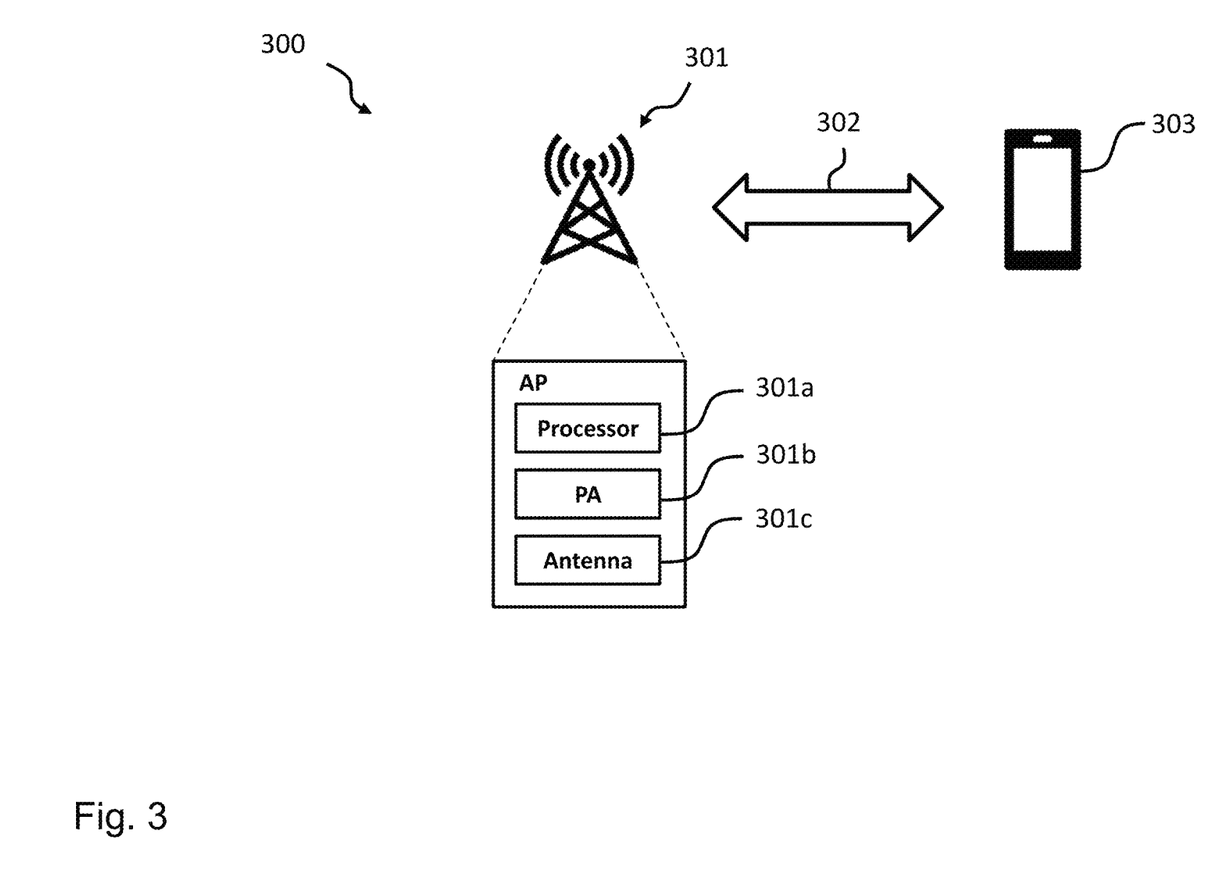
FIG. 3 is a schematic diagram illustrating a wireless transmitter according to an embodiment transmitting data to a wireless receiver.

FIG. 3 is schematic diagram illustrating a wireless network 300 including a wireless transmitter 301 and a wireless receiver 303 configured to communicate via a wireless link or communication channel 102. The wireless network 300 may be a WLAN, i.e., a wireless local area network based on IEEE 802.11 and related standards. In an embodiment, the wireless transmitter 301 may be a Wi-Fi transmitter 301 and the wireless receiver 303 may be a Wi-Fi receiver 303. In the exemplary wireless network 300 shown in FIG. 3 the wireless transmitter 301 is a wireless access point 301, such as a wireless router, and the wireless receiver 303 is a wireless station or client device 303, such as a smartphone. As can be taken from FIG. 3, in an embodiment, the wireless transmitter 301 may include a processor 301A as well as a wireless communication interface including a power amplifier (PA) 301B and an antenna 301A. The same or similar components may be included in the wireless receiver 303. Although only a single wireless receiver 303 is shown in FIG. 3, it will be appreciated that the wireless transmitter 301 may be configured to communicate with a plurality of wireless receivers 303 via respective wireless links.

As will be described in more detail below, the wireless transmitter 301 is configured to transmit data to the wireless receiver 303 via the wireless link 302 using a selected modulation and coding scheme, MCS, of a plurality of selectable MCSs, such as the MCSs defined by IEEE 802.11 and related standards. As described above in the context of the table shown in FIG. 2, each MCS defines an upper limit of an error vector magnitude, EVM, corresponding to an upper limit of the transmitted power $P_{T_x}$ (also referred to as transmission power) of the wireless transmitter 301. The wireless transmitter 301 is configured to transmit data to the wireless receiver 303 using the selected MCS and an adjusted transmitted power that is larger or smaller than the upper limit of the transmitted power, if the combined effects of an adjusted EVM and an adjusted received power at the wireless receiver 303 caused by the adjusted transmitted power result in an improved data transmission performance in comparison with a data transmission using a transmitted power equal to the upper limit of the transmitted power. In other words, the wireless transmitter 301 is configured to determine whether the combined effects of an adjusted EVM and an adjusted received power at the wireless receiver 303 caused by the adjusted transmitted power result in an improved data transmission performance in comparison with a data transmission using a transmitted power equal to the upper limit of the transmitted power, as will be described in more detail in the following.

In an embodiment, the improved data transmission performance may be a larger signal-to-interference-plus-noise ratio, SINR, at the wireless receiver 303, where the wireless transmitter 301 is configured to determine whether the combined effects of the adjusted EVM and the adjusted received power caused by the adjusted transmitted power result in a larger SINR at the wireless receiver 303 on the basis of information about a SINR at the wireless receiver 303 for a preceding data transmission. In an embodiment, the wireless transmitter 301 is configured to obtain the information about the SINR at the wireless receiver 303 for the preceding data transmission from the wireless receiver 303.

A measure of the performance of the wireless link 102 (per MCS) between the wireless transmitter 301 and the wireless receiver 303 is the SINR at the wireless receiver 303; i.e., the following power ratio:

$$SINR = \frac{P_{Rx}}{I_{Rx}} = \frac{P_{Rx}}{TxEVM_{Rx} + N_{Rx}}, \quad \text{(Eq. 1)}$$

where the total noise $I_{Rx}$ at the wireless receiver 303 has been split into the sum of two components, namely a first noise component $TxEVM_{Rx}$ originating from the distortion induced by the power amplifier 301B of the wireless transmitter 301 (after passing through the same wireless channel 102 which the desired signal has passed through) and a second noise component $N_{Rx}$ denoting the remaining ambient noise power, on which the wireless transmitter 301 has no control whatsoever.

By a further simple mathematical manipulation (dividing both the numerator and denominator of the RHS of Equation 1 by the transmitted power $P_{Rx}$) the SINR at the wireless receiver 303 can be expressed in the following way:

$$SINR = \frac{1}{\left(\frac{1}{SNR}\right) + EVM},\quad \text{(Eq. 2)}$$

where the further relations $$SNR = \frac{P_{Rx}}{N_{Rx}} \text{ and } EVM = \frac{TxEVM_{Rx}}{P_{Rx}}$$

nave been used. As will be appreciated, the SNR at the wireless receiver 303 is simply proportional to the transmitted power $P_{Tx}$ of the wireless transmitter 301, because the second ambient noise component $N_{Rx}$ at the wireless receiver 303 is independent of the transmitted power $P_{Tx}$.

In the following two main embodiments of the wireless transmitter 301 will be described for selecting an optimal combination of the transmitted power $P_{Tx}$ of the wireless transmitter 301 and a PHY rate corresponding to a selected MCS. The wireless transmitter 301 may be configured to implement either one or both of these embodiments, i.e., in a separate or cascaded fashion.

The first main embodiment makes use of the fact that the wireless transmitter 301 has some information about the SINR at the wireless receiver 303. For instance, in an embodiment, where the wireless transmitter 301 is implemented as a Wi-Fi access point 301 and the wireless receiver 303 is a Wi-Fi client device or station 303, the wireless receiver 303 may feedback link adaptation information to the wireless transmitter 301, for instance in a HT or VHT header, and/or SINR information, for instance by a VHT compressed MU Beam-Forming (BF) feedback report. In an embodiment, the wireless transmitter 301 may be configured to use this information about the SINR of the wireless receiver 303, which was "measured" at a given EVM level (controlled by and thus known to the wireless transmitter 301), to determine the SNR of the wireless receiver 303 on the basis of equation 2 above as follows:

$$SNR_0 = \frac{1}{\left(\frac{1}{SINR_0}\right) - EVM_0} = \left(\frac{1}{SINR_0} + f(P_{Tx,0})\right)^{-1},\quad \text{(Eq. 3)}$$

where the subscript "0" denotes quantities during a previous data transmission, i.e., where the transmitted power was $P_{Tx,0}$. The functional dependence between the transmitted power $P_{Tx}$ and the Error Vector Magnitude, i.e., EVM=f($P_{Tx}$) is defined by the power amplifier 301B. For available power amplifiers this relationship may be taken from a data sheet of the respective power amplifier. Thus, in an embodiment, the wireless transmitter 301 is configured to estimate a signal-to-noise ratio, SNR, at the wireless receiver 303 for a preceding data transmission on the basis of the information about the SINR at the wireless receiver 303 for the preceding data transmission and the relation EVM=f($P_{Tx}$) between the transmitted power of the wireless transmitter 301 for the preceding data transmission and the EVM resulting from the transmitted power for the preceding data transmission.

In an embodiment, the wireless transmitter 301 is configured to estimate the current SNR at the wireless receiver 303 by scaling the previous SNR using as a weighting factor the ratio between the adjusted transmitted power P and the transmitted power for the preceding data transmission. In other words, according to an embodiment the wireless transmitter 301 is configured to estimate the SNR for a current or upcoming transmission event on the basis of the following equation:

$$SNR(P) = SNR_0 \cdot \frac{P}{P_{Tx,0}}. \quad \text{(Eq. 4)}$$

This can be also expressed as $$SNRdB(P) = SNRdB_0 + \Delta PdB \quad \text{(Eq. 4')},$$

where, for any quantity X, its equivalent value XdB in dB scale is obtained via $XdB = 10 \log_{10} X$. Based on the interpolation estimation the wireless transmitter 301 is configured to select an optimal value for the transmitted power, which maximizes the SINR at the wireless receiver 303, on the basis of the following equation:

$$P_{Tx} = \arg\max_P SINR(P) = \arg\min_P \left(\frac{1}{SNR(P)} + f(P)\right), \quad \text{(Eq. 5)}$$

Figure 4:
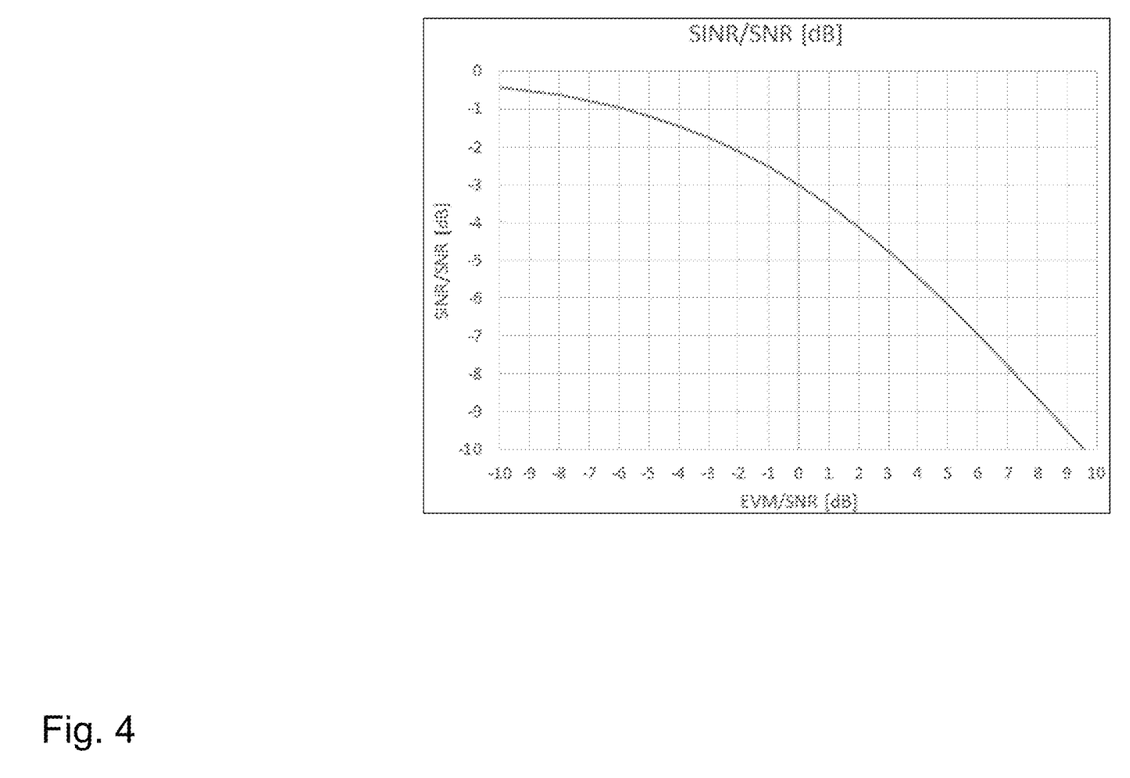
FIG. 4 shows a graph illustrating the relation between the SINR and the EVM at the wireless receiver (both normalized by the SNR)

As will be appreciated, the that this function of the transmitted power, subject to the minimization of the argument on the right hand side of equation 5 is readily calculable at the wireless transmitter 301 making use of equation 3 and 4 and the preceding assumptions. The relation, i.e., the functional relationship between the SNR, the SINR and the EVM for an exemplary power amplifier 301B is shown in FIG. 4.

Once the wireless transmitter 301 has determined and adjusted to the optimal transmitted power $P_{Tx}$ using equation 5, the wireless transmitter 301 may further determine the corresponding maximal SINR, i.e. SINR($P_{Tx}$) and on the basis thereof the optimal MCS for maximizing the transmission of data to the wireless receiver 303.

In an embodiment, the improved data transmission performance may be a larger goodput at the wireless receiver 303, where the wireless transmitter 301 is configured to determine whether the combined effects of the increased EVM and the increased received power caused by the increased transmitted power result in a larger goodput at the wireless receiver 303 for a plurality of increased transmitted powers and a plurality of MCSs, as will be described in more detail in the following.

In an embodiment, a rate control algorithm, RCA, may be implemented on the wireless transmitter 301 for determining an optimal combination of transmitted power $P_{Tx}$ and selected MCS. In an embodiment, the wireless transmitter 301 may implement an algorithm of the Minstrel algorithm type, i.e., using a probing mechanism in a trial-and-error fashion in order to adjust the transmitted power $P_{Tx}$ and the MCS (associated with a PHY rate) for finding a combination of these quantities that maximizes the goodput. During a Minstrel probing event, the Minstrel algorithm may occasionally try to assess the impact on the goodput of (a) an adjusted transmitted power at the same PHY rate, i.e., MCS and (b) an adjusted PHY rate, i.e., MCS at the same transmitted power and, thus, monitor the goodput of the different pairs of transmitted power and PHY rate, i.e., MCS. In an embodiment, the wireless transmitter 301 implementing, for instance, the Minstrel algorithm may select the pair with the maximal goodput for the next data transmission using the results of earlier probing attempts, based on the Rx ACK feedback reports from the wireless receiver 303.

Figure 5A:
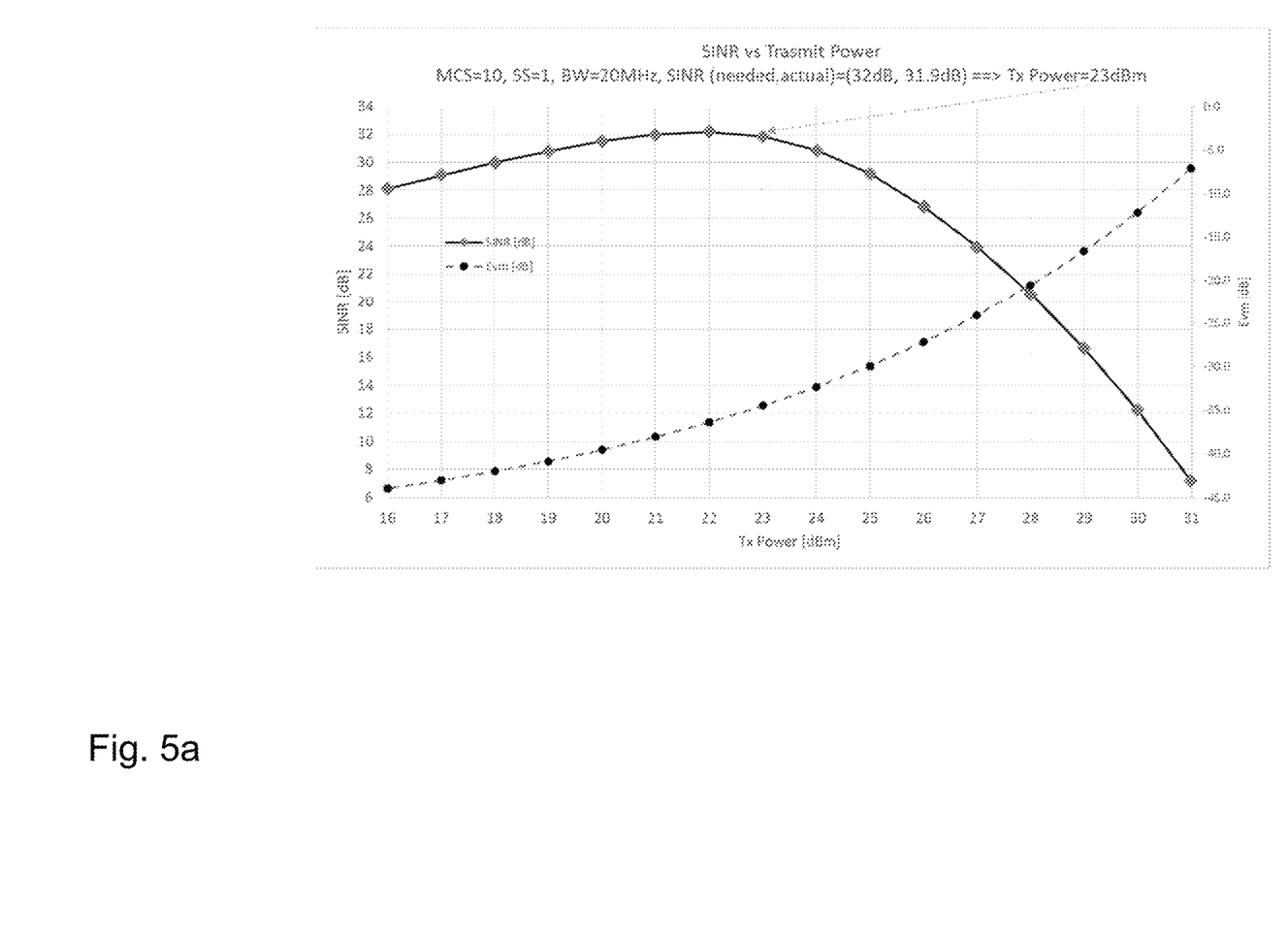
FIG. 5A shows graphs illustrating the relation between the SINR at the wireless receiver and the transmitted power of the wireless transmitter and the relation between the EVM and the transmitted power of the wireless transmitter.
Figure 5B:
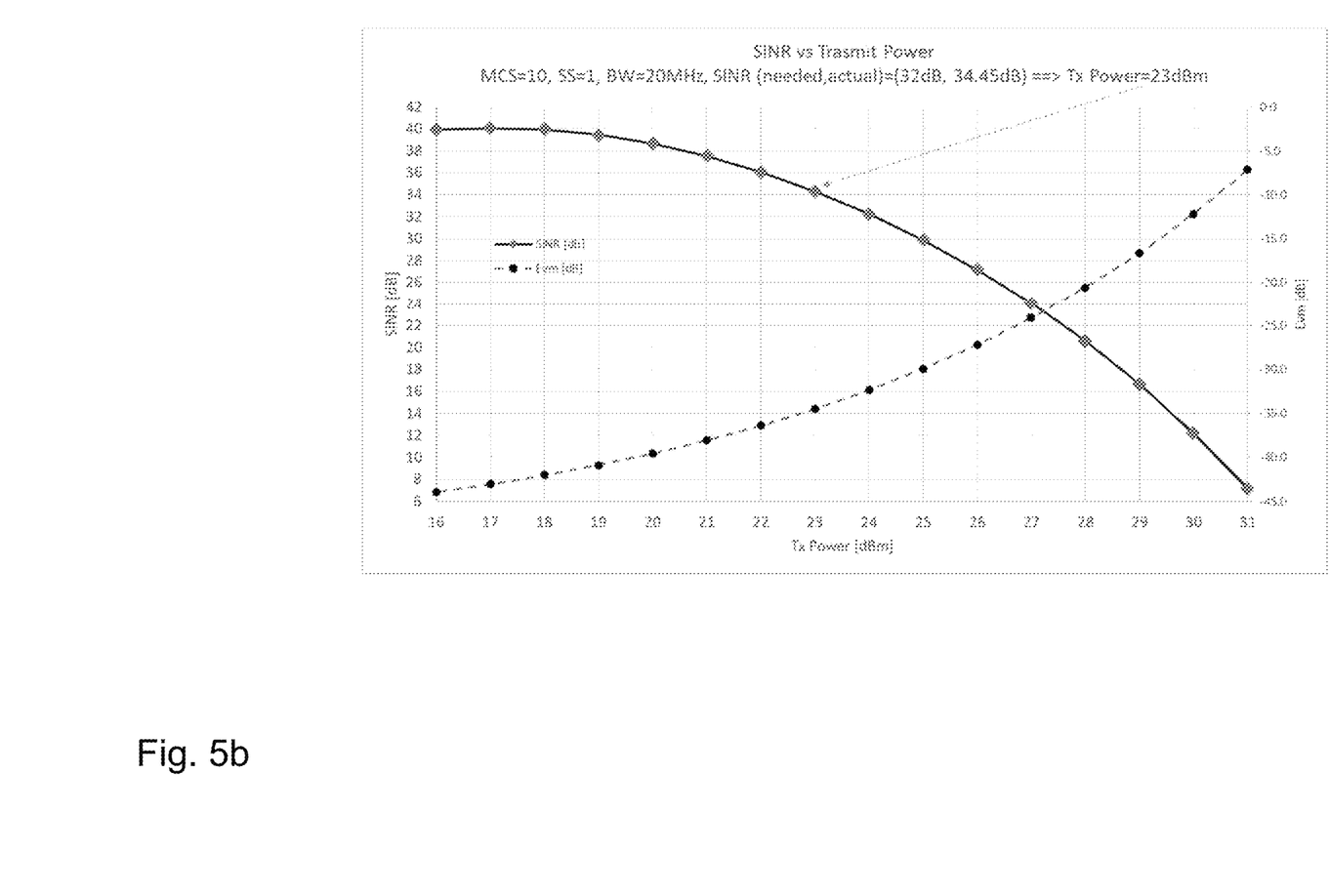
FIG. 5B shows graphs illustrating the relation between the SINR at the wireless receiver and the transmitted power of the wireless transmitter and the relation between the EVM and the transmitted power of the wireless transmitter (for a different SNR level at the wireless receiver than for FIG. 5A)

FIGS. 5A and 5B illustrate the potential gains achievable by the transmission power adjustment implemented by the wireless transmitter 301 according to embodiments. In both FIGS. 5A and 5B, the dashed-line curves show the (same) exemplary functional dependence of the Tx-EVM on the transmitted power of the wireless transmitter 301 based on the data sheet of a commercially available Wi-Fi power amplifier 301B. Moreover, in both FIGS. 5A and 5B, the exemplary scenarios pertain to single-stream transmission using MCS=10 (over channel BW of 20 MHz), which requires (a) SINR≤32 dB for yielding nonzero goodput, and (b) Tx power≥23 dBm (for complying with the spec constraint of EVM≥−35 dB). The difference between the two examples is that in the first example shown in FIG. 5A the actual SINR at the wireless receiver 303 is 31.9 dB, whereas in the second example shown in FIG. 5B it is equal to 34.45 dB.

A prior-art transmitted power selection mechanism would set the Tx power—in both cases—to 23 dBm, based on the EVM constraint alone and regardless of the actual SINR. In contrast, according to embodiments, the wireless transmitter 301 is configured to adjust the transmitted power by looking for the respective maximum of the SINR curves (in the region $P_{Tx} \geq 23$ dBm), which are attained in the two different scenarios at $P_{Tx}$=22 and 17 dBm, respectively.

In the first scenario shown in FIG. 5A the gain achieved by the wireless transmitter 301 according to embodiments is rather small, as the gap between SINR (22 dBm) and SINR (23 dBm) in FIG. 5A is rather negligible (both being −32 dB). But for the second scenario it can be taken from FIG. 5B that SINR (17 dBm)≈40 dB, whereas SINR (23 dBm) ≈34 dB, i.e., a SINR gain of ~6 dB at the wireless receiver 303 achieved by the transmitted power adjustment of the wireless transmitter 301. As already described above, such a significant increase of the SINR at the wireless receiver 303, allows the wireless transmitter 301 to select another MCS associated with a higher PHY rate for the upcoming data transmission, namely MCS=11 (requiring minimal SINR of 35 dB) instead of the MCS=10, which may further—and even more substantially—improve the goodput of the wireless link 102.

Figure 6:
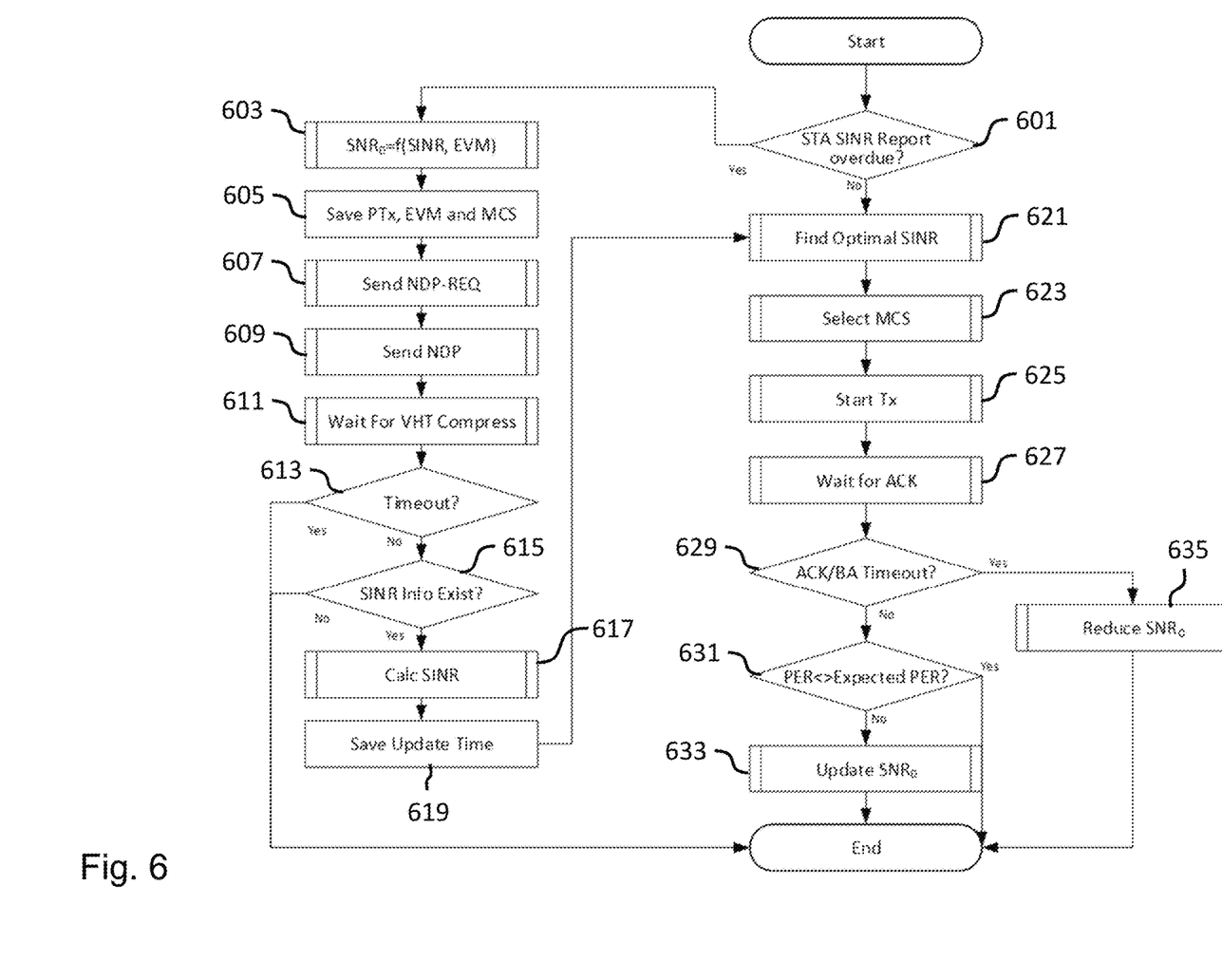
FIG. 6 is a flow diagram illustrating different aspects of a wireless data transmission method according to an embodiment implemented by a wireless transmitter according to an embodiment.

FIG. 6 is a flow diagram showing in more detail steps performed by the wireless transmitter 301 according to an embodiment for adjusting to an optimal pair of transmitted power $P_{Tx}$ and PHY rate, i.e., MCS. The embodiment shown in FIG. 6 makes use of feedback from the wireless receiver 303 about the SINR for a previous data transmission. This feedback may be provided, for instance, in the form of VHT header or using an explicit MU BF report. In the embodiment shown in FIG. 6, the feedback is provided by the wireless receiver 303 using an explicit MU BF report.

Step 601: The wireless transmitter 301 checks whether the feedback from the wireless receiver 303 has already been received. If this is the case processing proceeds with step 621, otherwise with step 603.

Step 603: The $SNR_0$ is estimated as a function of the SINR at the wireless receiver 303 and the transmission power in the manner described above.

Step 605: The parameters are saved for the next transmissions (as a reference). These values are updated after each Rx SINR update.

Steps 607, 609, 611, 613, 615 describe a known 802.11 process for obtaining a Rx SINR measurement from the wireless receiver 303 using beamforming and NDP (Null Data Packet) messages, including a Compressed BF message.

Step 617: The wireless transmitter 301 determines the SINR based on the information provided in the Compressed BF message in the manner described above.

Step 619: The wireless transmitter 301 saves $SINR_0$ for later uses (calculate $SNR_0$).

Step 621: On the basis of equation 5 above the wireless transmitter 301 determines the optimal transmission power, and, in turn, $SINR_{Rx}$ and EVM using the optimal transmission power.

Step 623: Based on the $SINR_{Rx}$ determined in the previous step, the wireless transmitter 301 selects the optimal MCS, i.e., the MCS maximizing the goodput.

Step 625: The wireless transmitter 301 starts the transmission process, e.g., by sending PLCP, MSDU(s) and the like to the wireless receiver 303.

Step 627: The wireless transmitter 301 waits for the ACK message from the wireless receiver 303 (should start in about 20 to 28 usec).

Step 629: If a timeout occurs, it may indicate that the wireless receiver 303 did not receive any data (bad MCS selection). In this case the wireless transmitter 301 is configured to reduce the estimated $SNR_0$ in step 635 (i.e., noise is assumed to be stronger than before).

Step 631: If the packet error rate (PER) is different than expected, the PER estimation used for calculating the goodput is updated.

Step 633: The wireless transmitter 301 updates $SINR_0$ according to a selected error function (for example, reduce SINR in 2 dB).

Figure 7:
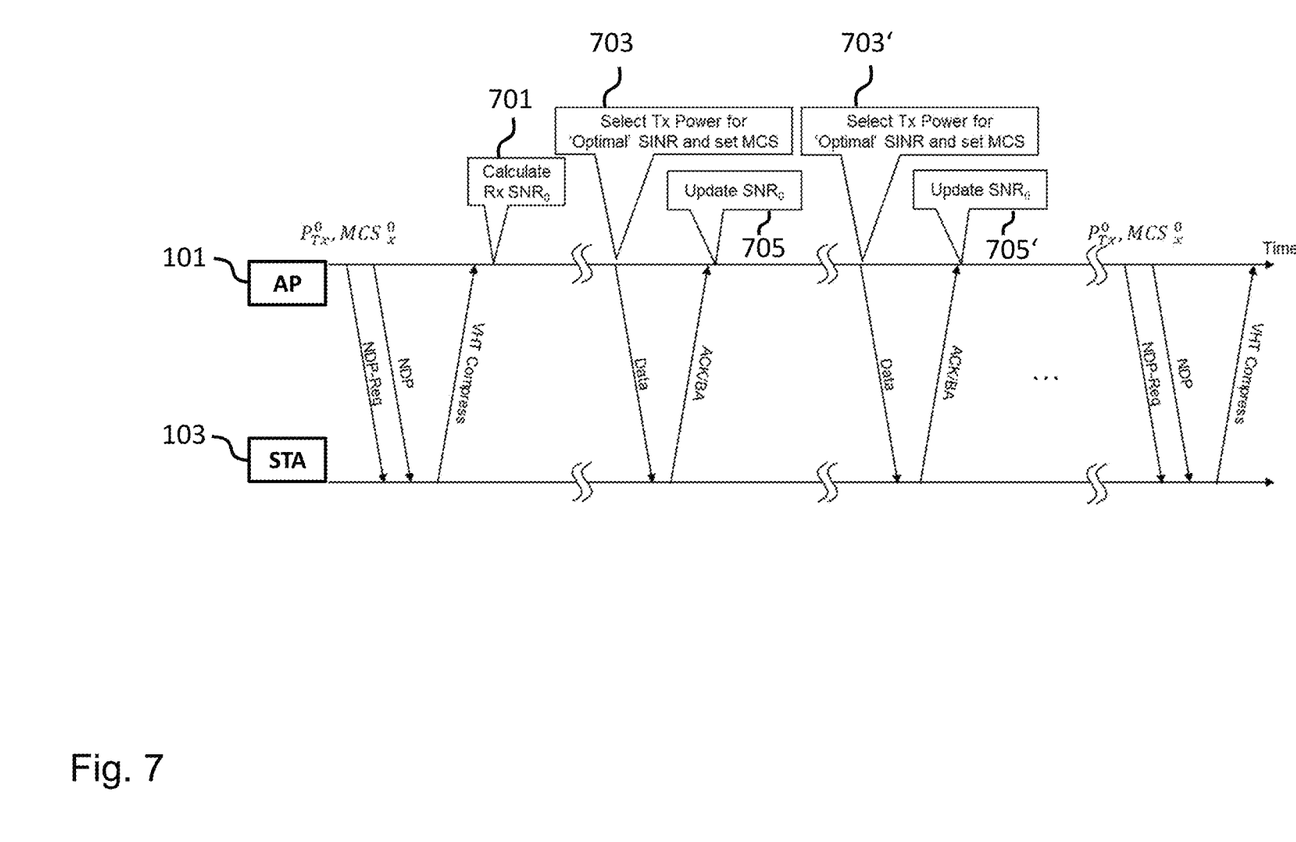
FIG. 7 is a signaling diagram illustrating different aspects of the interaction between a wireless transmitter according to an embodiment and a wireless receiver.

FIG. 7 is a signalling diagram corresponding to the embodiment shown in FIG. 6 with the wireless transmitter 301 being implemented as a Wi-Fi access point (AP) 301 and the wireless receiver 303 as a Wi-Fi client device or station 303. Based on the feedback provided by the Wi-Fi station 303 by a VHT Compress message the Wi-Fi AP 301 determines in step 701 the SNR at the Wi-Fi station 303 for a previous data transmission. In step 703 the Wi-Fi AP 301 adjusts the transmission power to the optimal transmission power corresponding to the optimal SINR and may select a different MCS for transmitting data to the Wi-Fi station 303. Based on further feedback from the Wi-Fi station 303 the Wi-Fi AP 301 updates its estimate of the SNR at the Wi-Fi station 303 in step 705 of FIG. 7 for a further adjustment of the transmission power to the optimal transmission power (step 703').

Figure 8:
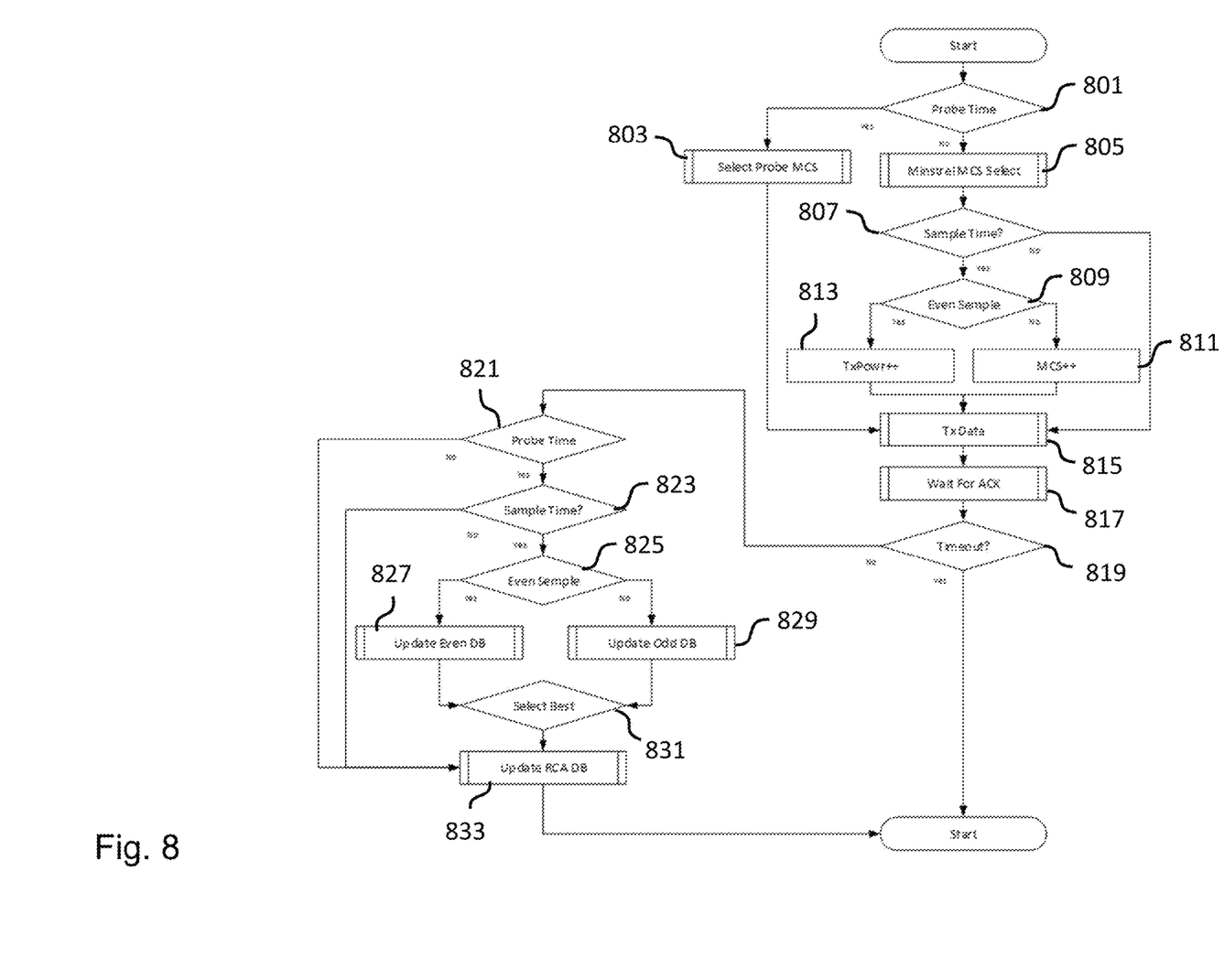
FIG. 8 is a flow diagram illustrating different aspects of a wireless data transmission method according to a further embodiment implemented by a wireless transmitter according to a further embodiment.

FIG. 8 is a flow diagram showing in more detail steps performed by the wireless transmitter 301 according to a further embodiment for adjusting to an optimal pair of transmitted power $P_{Tx}$ and PHY rate, i.e., MCS. The embodiment shown in FIG. 8 makes use of a rate control algorithm (RCA) implemented by the wireless transmitter 301. By way of example, in the embodiment shown in FIG. 8 the wireless transmitter 301 uses the Minstrel algorithm for selecting the optimal Tx-Power & PHY-rate pair.

Step 801: The wireless transmitter 301 checks whether the probing process should be done. Decision on probing may depend on PER, last PER update (ellipse time from last update), used MCS, and the like. If this is the case processing proceeds with step 803, otherwise with step 805.

Step 803: The wireless transmitter 301 selects the MCS for the next frame Tx. MCS selection may depend on the current MCS, PER and any knowledge about other MCSs the wireless transmitter 301 might have. A good probing balance is achieved between the need to have knowledge about all MCS and the probing overhead i.e., probe few MCS that are sufficient to get a reasonable MCS decision.

Step 805: The wireless transmitter 301 uses the Minstrel MCS selection process for selecting the MCS that maximizes $PhyRate_{MCS}(1-PER_{MCS})$.

Step 807: The wireless transmitter 301 checks whether the Tx power sample process should be done. Decision on sampling may depend on the PER, last PER update (ellipse time from last update), used MCS, and the like. If this is the case processing proceeds with step 809, otherwise with step 815.

Step 809: The wireless transmitter 301 has two sampling options, namely same power with higher MCS or same MCS with higher Tx power. In odd samples, the wireless transmitter 301 tries higher MCS (step 813) and in even samples, the wireless transmitter 301 tries higher Tx power (step 811).

Step 811: The wireless transmitter 301 selects a higher Tx power with the same MCS.

Step 813: The wireless transmitter 301 selects a higher MCS with the same Tx power.

Step 815: The wireless transmitter 301 transmits the data with the sample parameters selected in steps 811 or 813.

Step 817: The wireless transmitter 301 waits for the ACK message from the wireless receiver 303 (should start in 20 to 28 usec).

Step 819: The wireless transmitter 301 checks if the ACK has been received. If this is the case, processing proceeds with step 821, otherwise the process is terminated.

Steps 821 to 833: The wireless transmitter 301 updates the RCA internal data base according to the last Tx information i.e., update probe database if this is a probe event or update sample database if this is a sample event.

The person skilled in the art will understand that the "blocks" ("units") of the various figures (method and apparatus) represent or describe functionalities of the embodiments (rather than necessarily individual "units" in hardware or software) and thus describe equally functions or features of apparatus embodiments as well as method embodiments (unit=step).

In the several embodiments provided, it should be understood that the system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

What is claimed is:

1. A wireless transmitter configured to transmit data to a wireless receiver using a selected modulation and coding scheme (MCS) of a plurality of MCSs, each MCS defining an upper limit of an error vector magnitude (EVM) corresponding to an upper limit of a transmitted power of the wireless transmitter, wherein the wireless transmitter is configured to:
   transmit data to the wireless receiver using the selected MCS and an adjusted transmitted power that is larger or smaller than the upper limit of the transmitted power, when the combined effects of an adjusted EVM and an adjusted received power at the wireless receiver caused by the adjusted transmitted power result in an improved data transmission performance, wherein the improved data transmission performance is a larger signal-to-interference-plus-noise ratio (SINR) at the wireless receiver;
   determine whether the combined effects of the adjusted EVM and the adjusted received power caused by the adjusted transmitted power result in a larger SINR at the wireless receiver on the basis of information about a SINR at the wireless receiver for a preceding data transmission; and
   estimate a signal-to-noise ratio (SNR) at the wireless receiver for the preceding data transmission on the basis of the information about the SINR at the wireless receiver for the preceding data transmission and a relation between the transmitted power of the wireless transmitter for the preceding data transmission and the EVM resulting from the transmitted power for the preceding data transmission.

2. The wireless transmitter of claim 1, wherein the wireless transmitter is further configured to obtain the information about the SINR at the wireless receiver for the preceding data transmission from the wireless receiver.

3. The wireless transmitter of claim 1, wherein for determining whether the combined effects of the adjusted EVM and the adjusted received power caused by the adjusted transmitted power result in a larger SINR at the wireless receiver, the wireless transmitter is further configured to:
   estimate a current SNR at the wireless receiver by weighting the SNR at the wireless receiver for the preceding data transmission with the ratio between the adjusted transmitted power and the transmitted power for the preceding data transmission.

4. The wireless transmitter of claim 3, wherein for determining whether the combined effects of the adjusted EVM and the adjusted received power caused by the adjusted transmitted power result in a larger SINR at the wireless receiver, the wireless transmitter is further configured to:
   determine the current SINR at the wireless receiver on the basis of the current SNR at the wireless receiver and the relation between the transmitted power of the wireless transmitter and the EVM resulting from the transmitted power.

5. The wireless transmitter of claim 1, wherein the wireless transmitter further comprises:
   a power amplifier configured to transmit the data to the wireless receiver and the relation between the transmitted power of the wireless transmitter and the EVM resulting from the transmitted power is defined by the power amplifier.

6. The wireless transmitter of claim 1, wherein the wireless transmitter is further configured to determine the transmitted power which provides the maximal current SINR at the wireless receiver as the adjusted transmitted power.

7. The wireless transmitter of claim 1, wherein the wireless transmitter is further configured to switch to another MCS, when the combined effects of the adjusted EVM and the adjusted received power caused by the adjusted transmitted power result in a larger SINR at the wireless receiver.

8. The wireless transmitter of claim 1, wherein the improved data transmission performance is a larger goodput at the wireless receiver and the wireless transmitter is further configured to determine whether the combined effects of the increased EVM and the increased received power caused by the increased transmitted power result in a larger goodput at the wireless receiver for a plurality of increased transmitted powers and a plurality of MCSs.

9. The wireless transmitter of claim 8, wherein the wireless transmitter is further configured to select the adjusted transmission power and MCS providing the largest goodput at the wireless receiver.

10. The wireless transmitter of claim 9, wherein the wireless transmitter is further configured to select the adjusted transmission power and the MCS providing the largest goodput at the wireless receiver with a rate control algorithm (RCA).

11. A method for transmitting data from a wireless transmitter to a wireless receiver using a selected modulation and coding scheme (MCS) of a plurality of MCSs, each MCS defining an upper limit of an error-vector-magnitude (EVM) corresponding to an upper limit of a transmitted power used for transmitting data, wherein the method comprises:

transmitting data to the wireless receiver using the selected MCS and an adjusted transmitted power that is larger or smaller than the upper limit of the transmitted power, when the combined effects of an adjusted EVM and an adjusted received power caused by the adjusted transmitted power result in an improved data transmission performance, wherein the improved data transmission performance is a larger signal-to-interference-plus-noise ratio (SINR) at the wireless receiver;

determining whether the combined effects of the adjusted EVM and the adjusted received power caused by the adjusted transmitted power result in a larger SINR at the wireless receiver on the basis of information about a SINR at the wireless receiver for a preceding data transmission; and estimating a signal-to-noise ratio (SNR) at the wireless receiver for the preceding data transmission on the basis of the information about the SINR at the wireless receiver for the preceding data transmission and a relation between the transmitted power of the wireless transmitter for the preceding data transmission and the EVM resulting from the transmitted power for the preceding data transmission.

12. A computer program product comprising program code stored on a computer readable storage medium which when executed causes a computer or a processor to perform the method according to claim 11 when the program code is executed by the computer or the processor.

* * * * *